April 8, 1947.  O. H. BANKER  2,418,455
MARINE REVERSING GEAR
Filed Nov. 11, 1943  8 Sheets-Sheet 3

Inventor:
Oscar H. Banker
By
Stone, Artman & Bisson
Attys.

April 8, 1947. O. H. BANKER 2,418,455
MARINE REVERSING GEAR
Filed Nov. 11, 1943 8 Sheets-Sheet 8

Fig. 10.

Inventor:
Oscar H. Banker.
By Stone, Artman & Bisson
Attys.

Patented Apr. 8, 1947

2,418,455

UNITED STATES PATENT OFFICE 2,418,455

MARINE REVERSING GEAR

Oscar H. Banker, Evanston, Ill., assignor to New Products Corporation, Chicago, Ill., a corporation of Delaware Application November 11, 1943, Serial No. 509,926

7 Claims. (Cl. 74—296)

1

The present invention relates to power transmitting means especially for marine propulsion and includes means for easily reversing the direction of propulsion.

Among the objects of the invention is to provide a novel transmission means which includes planetary type of transmission gears cooperative with brake means whereby the shifting from neutral to forward or reverse drive or from forward to reverse or from reverse to forward drives may be quickly, easily and efficiently effected.

In the embodiments chosen to illustrate the invention the driving and driven shafts are shown in alignment and are operatively connected by way of a cluster of planetary gears. One of the shafts has a gear for driving a driven gear or gears of the cluster. A second gear or gears of the cluster is operatively connected by way of a gear on the driven shaft whereby forward driving may be effected. A third gear or gears of the cluster is operatively associated with a novel type of brake means carried by the device so as to hold the cluster from aggregate rotation about the axes of the driving and driven shafts to effect the forward driving above described. For reverse rotation another novel type of brake means so operates as to hold from rotation a gear with which meshes the planetary third gear or gears of the cluster whereby, as said third gear or gears planetates about the held gear, to effect a driving in reverse direction of the second gear or gears of the cluster in mesh with the driven gear of the driven shaft. This is possible by reason of a differential of diameters of the second and third gears of the cluster.

Another object is the provision of a novel hydraulic control system by means of which forward and reverse driving connections are selectively establishable quickly and with minimum effort.

Another object is the provision in a reversing transmission of a hydraulic control for selecting forward and reverse drive and for applying a brake to prevent rotation of driven parts of the transmission only while the control is set in neutral to demobilize both the forward and reverse driving connections.

Still another object is the provision of a planetary type of reversing gear unit employing front and back sun gears, a middle driving sun gear and front and back drive and driven shafts all coaxially disposed and employing a journalled support for the driving sun gear independently of the drive shaft to widen the tolerance limits in the coaxial relation of such coaxial parts.

A further object is the provision of an improved

2 planetary gear transmission unit having coaxial front and back sun gears arranged coaxially with a middle sun gear having opposite end hub portions journalled respectively within said front and back sun gears and a shaft extending from a driving connection with the hub of the middle gear outwardly through the hub of one of the other gears.

Other objects, advantages, capabilities and features are comprehended by the invention as will later appear and as are inherently possessed by the invention.

Referring to the drawings.

Referring more in detail to the drawings, the embodiment shown in Figs. 1 to 8 inclusive comprises a housing barrel 1 closed at an end thereof by an end plate 2 suitably secured to the barrel 1 by securing elements 3, such as screws or the like, and having a hub 4 in turn closed by a plate 5 suitably secured to the hub 4 by securing elements 6, such as screws or the like; and closed at the other end thereof by an end plate 7 suitably secured to the barrel 1 by securing elements 8, such as screws or the like, and having integral hub portions 9 and 10 of which hub 10 is closed by an end plate 11 suitably secured to the hub 10 by securing elements 12, such as screws or the like.

Figures 1, 1A:
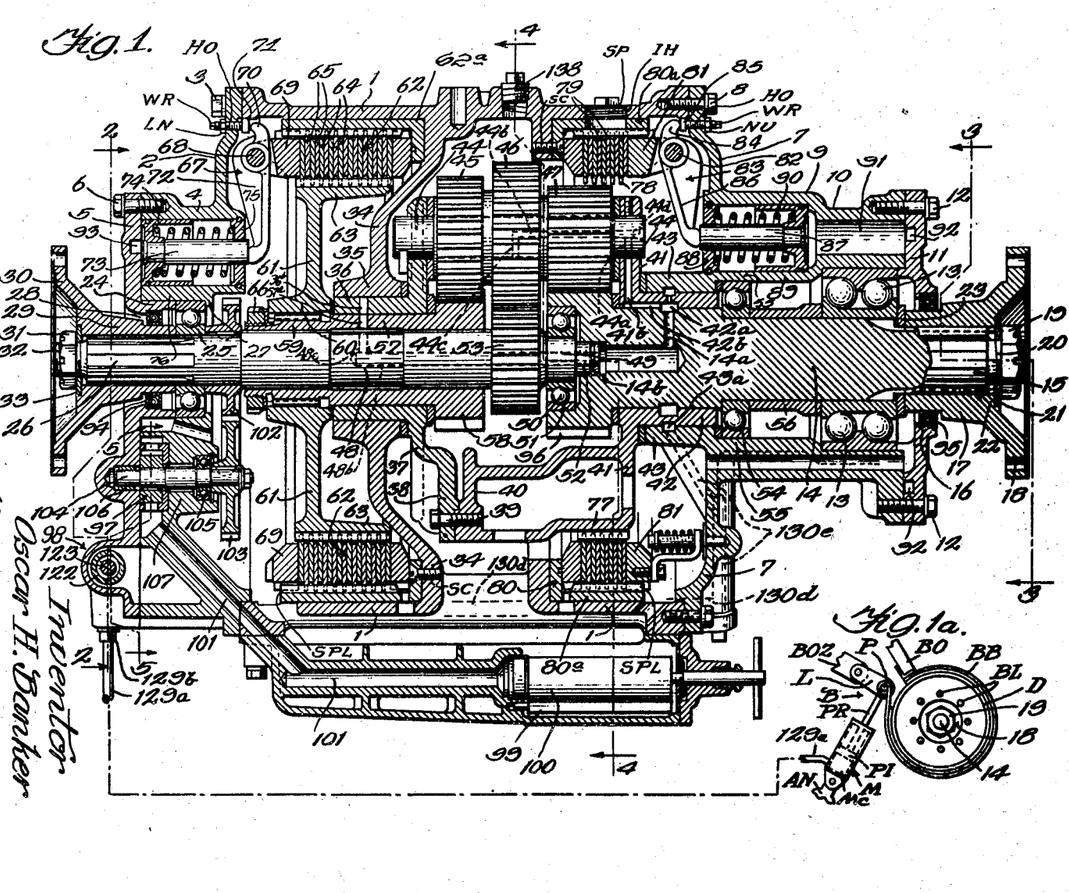
Fig. 1 is a longitudinal sectional view through a physical embodiment of the invention.
Fig. 1a is a fragmentary view in elevation of brake means for decelerating the drive when reversing it or coming to a stop and neutral condition.

The hub 10 supports a suitable bearing 13, which may be of the ball bearing type, for rotatably supporting a shaft 14 having a reduced end portion 15, extending through a central opening 16 of the plate 11. To the portion 15 of the shaft 14 is keyed the hub 17 of a coupling means 18 held in keyed securement by way of a nut 19 fixed to a threaded end portion 20 of the shaft 14. A suitable thrust plate 21 is preferably interposed between the nut 19 and the base 22 of the coupling means 18, as shown in Fig. 1. Between the hub 17 of the coupling means 18 and the bearing means 13 is also interposed a thrust plate 23.

At the other end of the structure (see Fig. 1) the plate 5 has an inturned thrust flange 24 against which abuts a bearing means 25, which may be of the ball bearing type, for rotatably supporting a shaft portion 26, the bearing means also abutting a flange 27 rigid with the hub 4. The end portion of the shaft 26 extends through a central opening 28 in the plate 5 and is keyed to the hub portion 29 of the coupling 30, the latter being secured in place by way of a nut 31 screwed onto a threaded end portion 32 of the shaft 26. A thrust plate 33 is interposed between the nut 31 and the base of the coupling 30, as shown in Fig. 1.

Integral with the barrel 1 is an inner wall 34 having a central bearing hub 35 in which is rotatably supported a bearing hub 36 of an end plate 37 of a gear cluster unit. The plate 37 has portions 38 (see Fig. 1) adapted for securement by way of suitable securing elements 39, such as screws, to complementary portions 40 of an opposite end plate 41 of the gear cluster unit mentioned above. The plate 41 has a bearing hub 42 rotatable in a bearing extension 43 formed integral with the end plate 7 and the hub portions 9 and 10.

Figure 4:
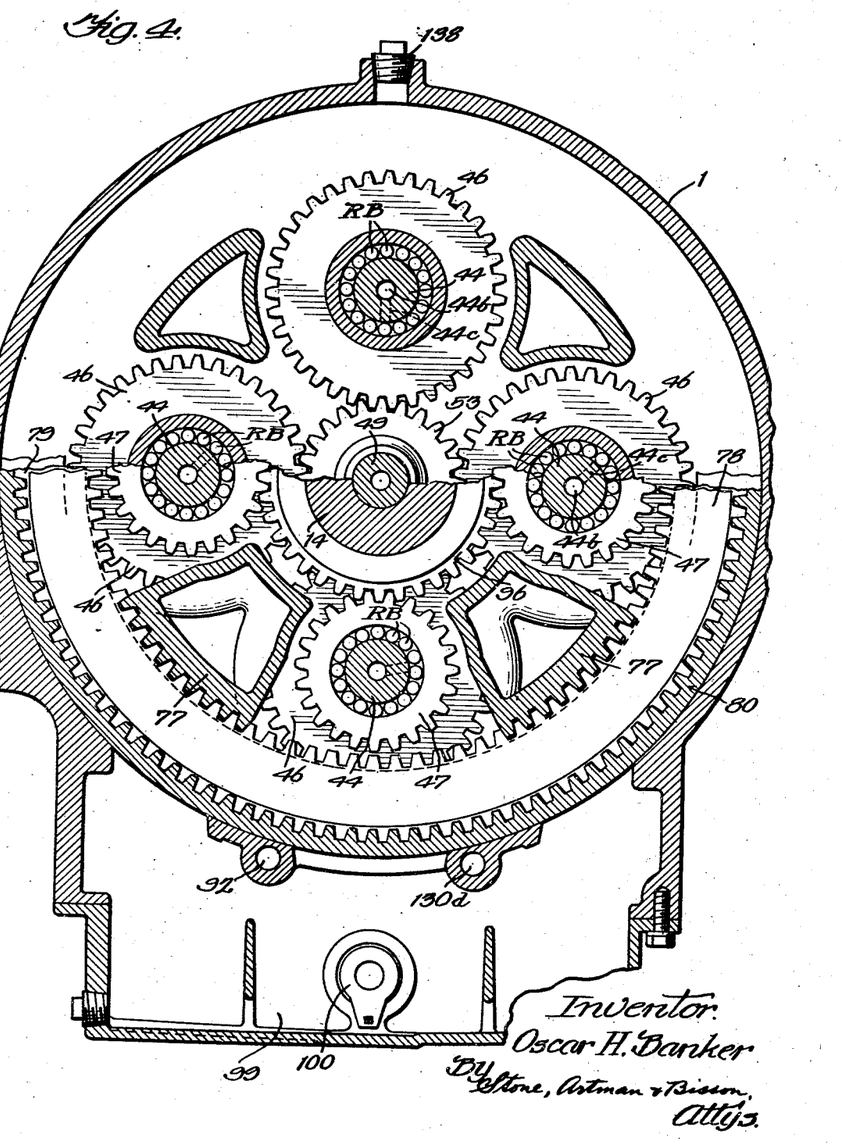
Fig. 4 is a transverse sectional view taken in planes represented by line 4—4 in Fig. 1 of the drawings.

The end plates 37 and 41 for the gear clusters are provided with opposed holes through and in which extend and are secured shafts 44 each rotatably carrying, as by way of roller bearings RB, planetary gears 45, 46 and 47 suitably secured together as a unit or cluster. Fig. 4 shows four sets of these gears and shafts but any number of sets may be used as desired and as the size of the device will permit.

The drive shaft 26 is integral with a shaft portion 48 having at its inner end a bearing portion 49 rotatable in a suitable bearing 50, such as a ball bearing, fitted into a recess 51 in the inner end of the shaft 14. The shaft bearing portion 49 is thus piloted in an inner end portion of the shaft 14.

On the shaft 48, as near the bearing part 49 thereof, is suitably fixed a sun gear 53 which is normally in mesh with the gears 46 and which drives the planet gears 46, 45 and 47. The shaft 14 rotates in the hub 42 and also in a bearing 54, such as a ball bearing, in a hub portion 55 forming a part of the hub 9. A sleeve 56 forms a rigid spacer for the ball bearing units 13 and 54.

Rotatable on the driving shaft portion 48 is a hollow shaft 57 carrying at its inner end a gear or pinion 58 in mesh with the gears 45, and having an outer end portion 59 splined to a hub 60 of a brake plate or web 61 cooperative with a disk ring type of brake means 62 carried by and held on the barrel 1, as generally shown in Fig. 1. The plate 61 has a rim 63 splined to multiple friction disklike rings 64 cooperative with multiple disk-like rings 65 of the brake means 62. The splined relation of the shaft portion 59 and the plate hub 60 is suitably maintained, as by a nut and lock washer means 66.

The brake 62 is operated by six radially directed levers 67 spaced circumferentially about the left end thereof, Fig. 1, and of which but one is shown in Fig. 1. Each lever 67 has a pivot element 68 carried by a slidable but non-rotative pressure plate 69 of the means 62. Each lever 67 has a toe 70 reacting against a respective toe piece 71 in the form of a headed member having a threaded shank turned into a threaded hole HO in the plate 2, and an arm 72 contacting an end of a respective piston rod 73 secured to a respective piston 74 and passing through an end wall or head 75 of a respective cylinder portion 76 of the hub 4. The outer end of each toe piece 71 has a wrench-receiving section WR to facilitate its being turned for axial adjustment, and a locknut LN is employed on the threaded shank of said member 71 to maintain the desired adjustment. The circumferential spacing of the cylinders 76 is illustrated by dotted line outlines of these cylinders in Fig. 2, and by examining Fig. 2 with Fig. 1 the circumferential spacing of the levers 67 associated therewith is ascertainable. Fluid is supplied to and exhausted from the cylinders 76 by a common duct, 93, shown by dotted lines in Fig. 2. The means 61—62 described above is designed to control the operation of the gear 58 either to allow it to rotate with the gear clusters 45—46—47 or to be braked so as to cause the gears 45, 46 and 47 to planetate about the gear 58.

Figures 3, 8:
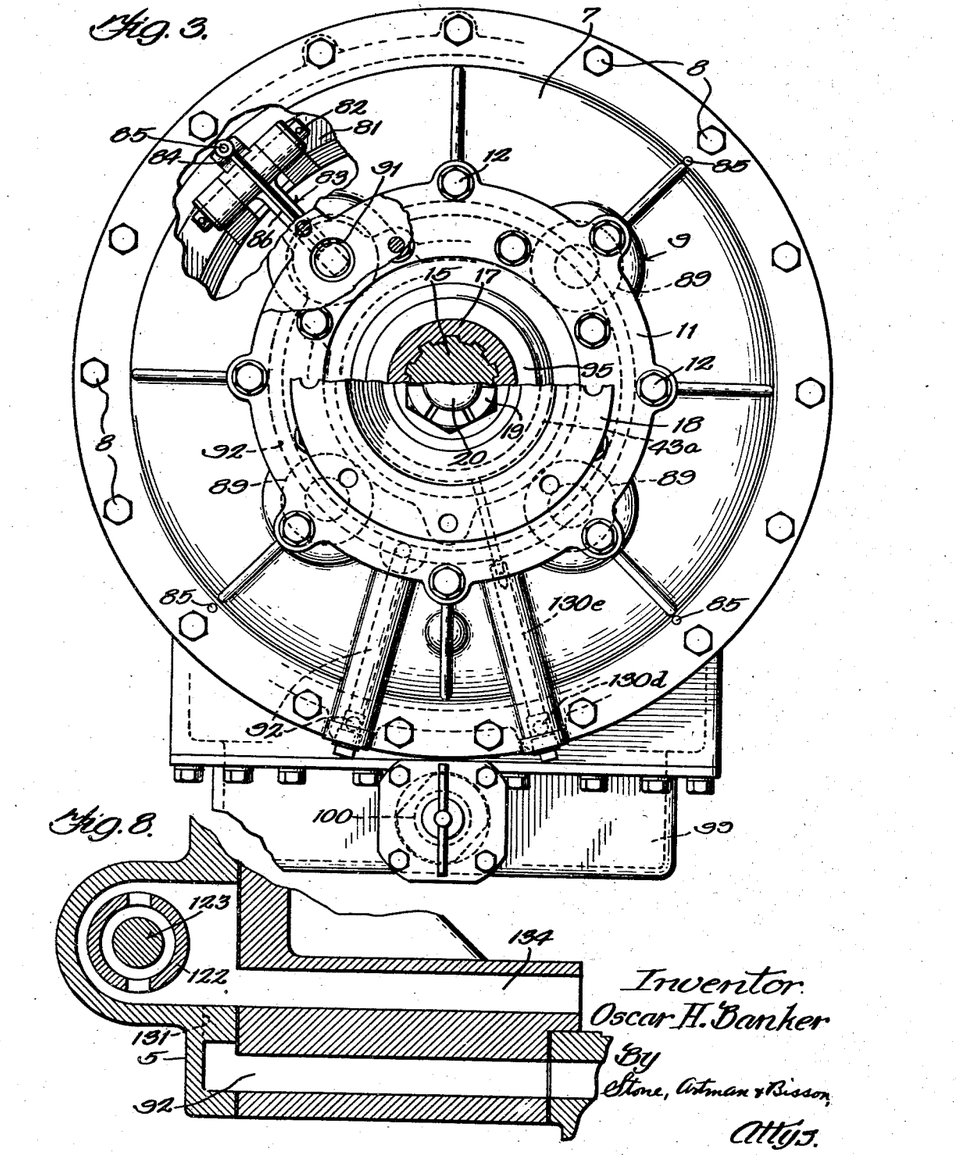
Fig. 3 is a part end view and part transverse view taken in a plane represented by line 3—3 in Fig. 1 of the drawings.
Fig. 8 is a fragmentary sectional view on an enlarged scale taken in planes represented by lines 8—8 in Fig. 5 of the drawings.

At the driven end of the device, the planet carrier end plate 41 has spaced segments 77 (see Figs. 1 and 4) suitably splined to disk-like rings 78 cooperative with suitable disk-like rings 79 of a clutch or brake device 80. As in the case of the brake 62, this brake is provided with a pressure plate 81 having circumferentially spaced pivots 82 for respectively associated levers 83 of which there are four of which but one is shown, in Fig. 1. Each lever has a toe 84 bearing on a respective toe piece 85 carried by the plate 7, and an arm 86 contacting an end of a respective piston rod 87 reciprocable through a cylinder end or head 88 of a respective cylinder 89 formed in the hub 9 and secured to a piston 90 in the cylinder 89. The shank of the toe piece 85 is screwed into a hole HO and is provided with a wrench-engaging section WR and a locknut NU similarly to the toe pieces 71 at the other end of the transmission. Opposite each piston 90 is a chamber 91 adapted to contain oil or other fluid under pressure, and fed from a pump, later described, by way of a duct 92, Figs. 1 and 3, which communicates with each of such chambers. In Fig. 3 the circumferential spacing of the cylinders 89 is illustrated by showing them in dotted outline, and this view together with Fig. 1 therefore illustrate the circumferential spacing of the associated levers 83. At the drive end of the device, as stated above, oil under pressure is fed to the pistons 74 by way of an oil duct 93. Between the coupling hub 29 and the end plate hub 24 is a suitable oil seal 94, and similarly between the coupling hub 17 and the plate 11 is a suitable oil seal 95.

An inspection hole IH is formed in the casing 1 and in the splined section of the brake plate holding ring 80a so that when a screw plug SP is removed from said hole the effect of adjusting toe piece 85 can be ascertained. This adjustment is normally made while the brake 80 is released at which time the toe piece 85 will be rotated to adjust the pressure plate 81 until the brake plates 78 and 79 virtually touch without pressure being applied therebetween. A hole (not shown) similar to IH is provided in the casing I and the brake plate holding ring 62a for the brake 62. By making these brake rings 62a and 80a separate from the casing I and attaching them thereto by the screws SC, the machining of the splines SPL is expedited, and also these rings can be made of a stronger, more preferred and costlier material than the casing proper.

On the inner end portion of the shaft 14 is provided a gear or pinion 96 normally in mesh with the gears 47. The planet gears 46 are of greatest diameter with reference to the gears 45 and 47, the gears 47 being of smallest diameter, and the gears 45 being of intermediate diameter, as shown in particular in Fig. 1.

The oil or other hydraulic fluid is controllably supplied to the cylinders 76 and 89 for effecting the desired different drives by way of a pump 97 and controlling valve device 98. The oil is drawn from a sump 99 (see Fig. 1) by way of a filter 100 and inlet duct or passage 101 to the pump 97.

The pump 97 is operated by way of a gear 102 suitably keyed to the shaft portion 26 and meshed with a driven gear 103 suitably keyed to a pump shaft 104 having suitable bearings 105 and 106 respectively, as ball bearings, in the pump body 107 and end plate 5 (see Fig. 1).

Figure 5:
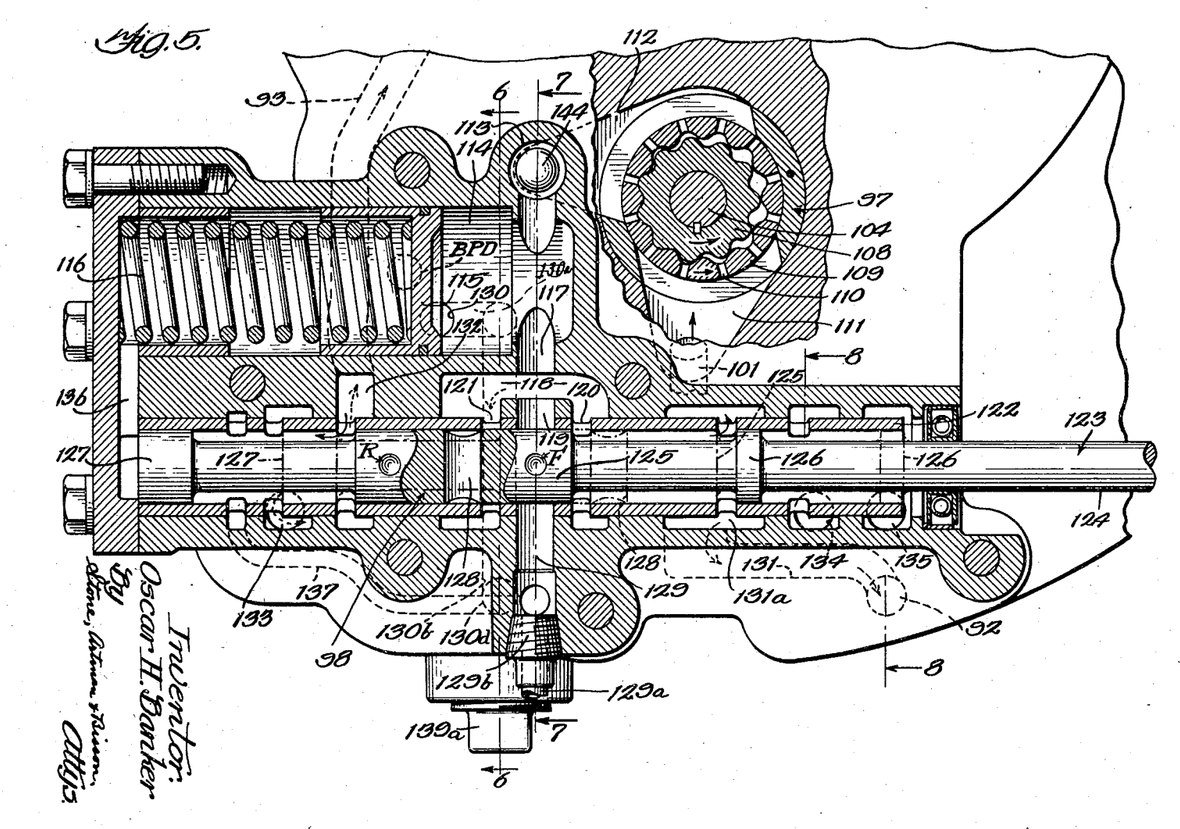
Fig. 5 is a fragmentary transverse sectional view on an enlarged scale taken in planes represented by lines 5—5 in Fig. 1 of the drawings.
Figure 6:
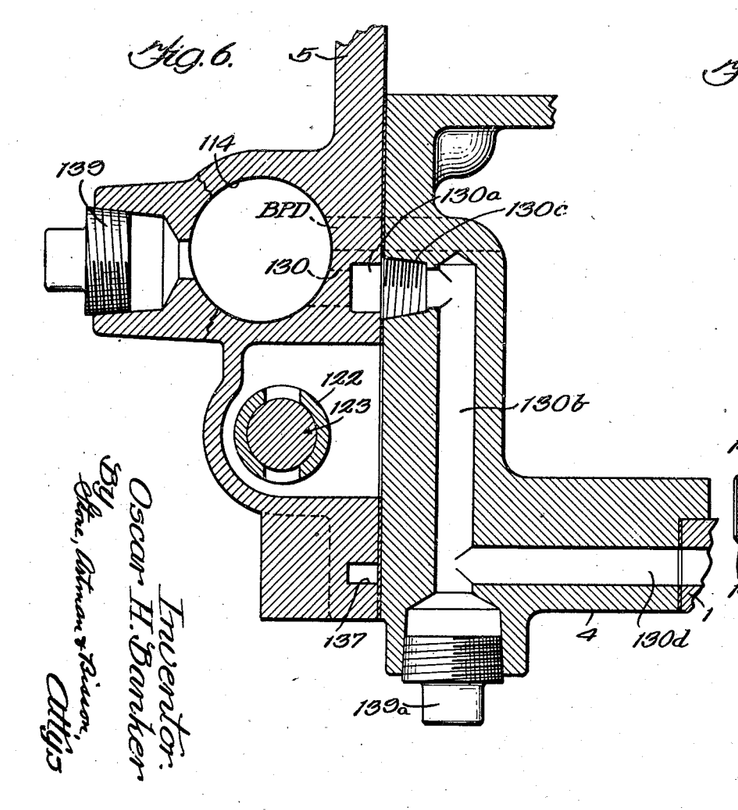
Fig. 6 is a fragmentary sectional view on an enlarged scale taken in a plane represented by line 6—6 in Fig. 5 of the drawings.

Referring to Fig. 5, the pump 97 is shown as of the gear rotary type comprising an inner or piston rotor 108 on the shaft 104 and operative with an outer or cylinder rotor 109 eccentric thereto. The rotor 109 has radial ports 110 communicating with an inlet chamber 111 connected to the duct or passage 101, and a discharge chamber 112 leading by way of a passage 113 to a pressure regulating chest 114 in which is located a dash pot piston 115 active against a spring 116. From chamber 114 a passage 117 leads downwardly to a port entry 118 communicating with ports 119, 120 and 121 of which ports 120 and 121 are for communication with ducts 92 and 93 for causing respective forward and reverse operation of the drive means. The duct 92 leads to the cylinders 89 and pistons 90 which operate the forward driving brake 80 and the duct 93 leads to the cylinders containing the pistons 74 which operate the reverse driving brake 62.

The control valve 98 comprises a valve cylinder 122 in which axially slides a control valve plunger 123 having an extension 124 suitably formed for manual selection of position to effect the desired operations of the driven means. The valve plunger 123 carries cylindrical valve components 125, 126 and 127 of which valves 125 and 126 control the supply of oil for forward operation of the device and valves 125 and 127 control the supply of oil for reverse operation of the device.

Figure 2:
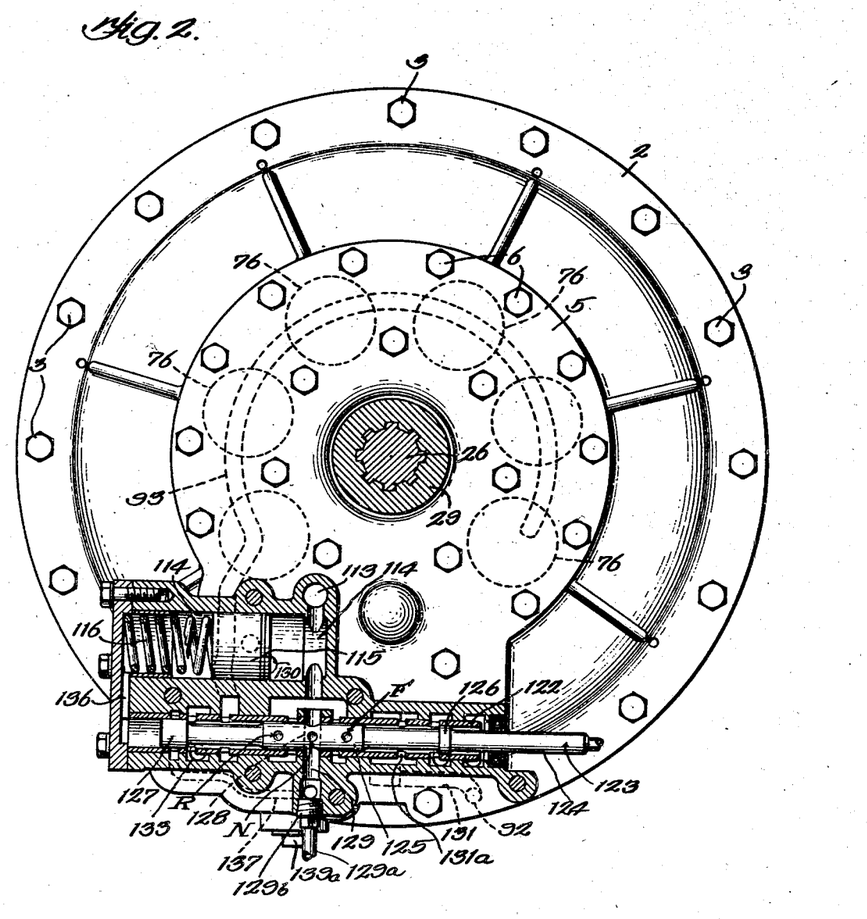
Fig. 2 is a part end view and part transverse sectional view taken in a plane represented by line 2—2 in Fig. 1 of the drawings.

The valve parts are shown in solid lines when in position for forward driving, and in dot-dash lines when in position for reverse driving. In Fig. 2 the valve is shown in neutral position when there is no driving and the oil is impressed upon a brake device B, Fig. 1a, for holding the driven shaft 14 against rotation. In this case the oil passes through a transverse passage 128 provided in the valve part 125 to a lower passage 129 in communication with a conduit 129a secured at the lower end of the passage 129 by a coupling member 129b threaded thereinto. This conduit 129a leads to a fluid motor M of the brake device B, and as shown in Fig. 1a the brake device includes a brake drum D secured to the driven shaft flange 18 by bolts BL. A brake band BB having one end anchored to a boss BO, which may be formed integrally with a part of the housing I, circumscribes the drum D. The free end of said brake band is coupled to a second boss BO2 by a pivoted link L. A pin P mutually serves to pivotally connect the free end of the band BB, an end of the link L and an end of a piston rod PR which projects from a piston PI in the motor cylinder MC. The lower end of the cylinder MC is pivotally attached to a suitable fixed anchorage AN. When fluid under pressure is introduced into the lower end of the cylinder MC the piston PI and its rod PR will be forced upwardly as viewed in Fig. 1a to cause tightening of the brake band and consequent stopping of the driven shaft 14. Since this action occurs under control of the valve control member 123, Figs. 2 and 5, when said member is in the neutral position, the brake mechanism B expedites reversal of the driven shaft by decelerating the same during the execution of a shift of the valve control member from the forward to the reverse position and vice versa. While the valve control member 123 is in the neutral position, Fig. 2, the enlargement on its left end will be in registry with the left end of an exhaust passage 137 to close the same and thus prevent escape of the oil from the lower end of the vertical passage 129 (see Figs. 5 and 7), but upon movement of the control valve 123 to either of the forward or reverse positions communication will be established between the left end of the duct 137 and a duct 133 which leads back to the sump 99. Therefore while the valve control member is in either of the forward or reverse positions fluid pressure in the motor M, Fig. 1a, will collapse causing release of the brake B.

Referring to Fig. 5, the valve parts are shown in full lines in the "forward" position whereby the oil flows from the chamber 114 by way of passages 117, 118 and 120, through cylinder 122 to passage 131 and thence to duct 92 (see Figs. 5, 8, and 1) and the pistons 90 for operating forward driving brake 80. Also, the oil for reverse pistons 74 is draining by way of the passage 93 to passage 132 and through cylinder 122 and thence through passage 133 to the sump 99. Passage 133 is constructed similarly to passage 134 in Figs. 5 and 8. When the valve plunger 123 is in the dot-dash line position shown in Fig. 5 the oil passes from chamber 114 through passages 117, 118 and 121 to cylinder 122 and thence to passage 132 and to passage 93 leading to the pistons 74 to effect the reverse drive operation of the brake 62. At the same time oil is drained from cylinders 89 by way of the passage or duct 92 to passage 131, cylinder 122, and drain passages 134 and 135 which are then intercommunicative through the valve cylinder 122 and lead to the sump 99; see Fig. 8.

Oil delivered into the pressure regulating chamber normally attains a pressure sufficient to displace the piston 115 to the left about the distance shown in Fig. 5 while compressing the spring 116. When reaching this position the piston 115 uncovers an end of a duct 130 which has a lateral portion 130a, Figs. 5, 6 and 7, communicating with a vertical portion 130b in the front wall plate 4 of the casing through a threaded portion 130c. This duct 130 including the portions 130a, 130b, 130c and other portions presently described is for feeding oil under pressure to certain bearings of the transmission gearing. Normally there is sufficient volume conveyed away by the duct 130 to accommodate the capacity of the pump so that the piston 115 compresses the spring 116 only the amount shown in Fig. 5, but should this pressure lubrication system become clogged the piston will move farther to the left, Fig. 5, to uncover a by-pass duct BPD which as clearly shown in Fig. 6, leads through the casing end wall 4 for discharge into the oil sump 99. Any leakage past the piston 115 can escape from the back end of the chamber 114 through a vertical passage 136 into the valve sleeve 122 from which it can drain through the drain passage 133 to the sump when the valve control member 123 is moved to the dot-dash line position of Fig. 5.

Referring now to Figs. 5, 6, 1 and 4, the lubrication duct 130 will be seen to comprise, in addition to the aforesaid portions 130a, 130b, and 130c, a portion 130d continuing from the portion 130c along the underside of the casing 1 to a duct portion 130e in the casing back end wall 7. In Figs. 1 and 3 the duct portion 130e is shown to communicate with a groove 43a in the bearing 43, and from this groove the oil reaches a concentric groove 42a in the carrier hub 42. Part of the lubrication oil is forced inwardly from the groove 42a through a radial channel 14a and axially of the drive shaft through a bore 48b, thence radially through passage portions 48c, 57a and 36b to provide lubrication for the bearing of the shaft portion 48 in the sleeve shaft 57, lubrication for the sleeve shaft 57 in the carrier hub 36, and lubrication for the carrier hub in the casing bearing 35. Another part of the lubrication oil is forced axially of the carrier hub through a channel 42b therein and thence radially through a channel 41b and a registering radial bore 44a in the non-rotatable cluster gear shaft 44 to an axial bore 44b in such shaft and thence out through a lateral bore 44c to lubricate roller bearings RB, Fig. 4, on which the associated planet gear cluster is journalled. Other sets of oil conducting ducts as that just described leading from the groove 42a also lead from said groove respectively to the other planet gear clusters.

Figure 7:
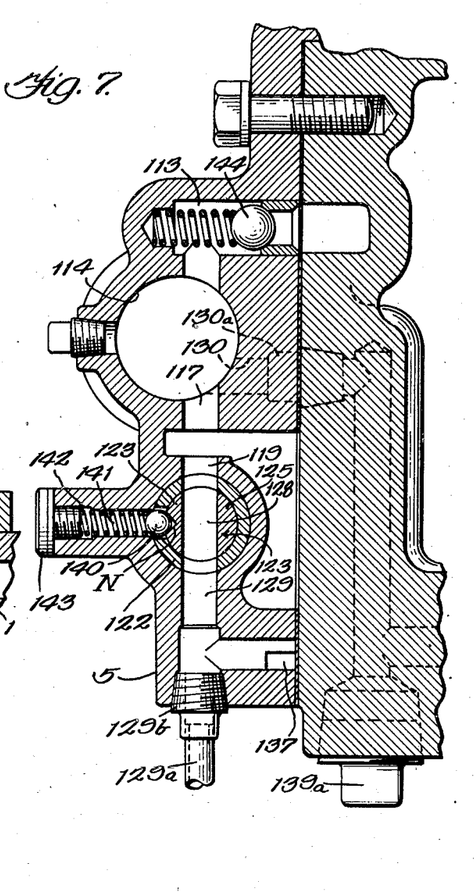
Fig. 7 is a fragmentary sectional view on an enlarged scale taken in a plane represented by line 7—7 in Fig. 5 of the drawings.

Detent means for releasably holding the sliding valve member 123 in its different operative positions are shown in detail in Figs. 2, 5 and 7. The sliding valve member has a series, such as three, detent recesses F, N and R, see Fig. 2, cooperative with a detent ball 140 pressed by a spring 141 in a bore 142 closed by a plug 143.

In the pump discharge passage 113 there is located a ball type check valve 144 for preventing any drop in pressure when the pump is running slowly, as when idling the motor and pump 97 or otherwise. Also it should be noted that upon sufficient slow speed of the pump for the valve 144 to close, the fluid discharge from the chamber 114 will stop when the spring 116 moves the piston 115 far enough to the right to cover the port of the lubrication passage 130, wherefore said valve 144 and the piston 115 cooperate to preserve pressure for preventing release of the then closed clutch.

In certain installations it may be desirable to cool the oil circulated through the lubrication circuit. Under these circumstances the passage 130 will be closed by a plug (not shown) screwed into the threaded portion 130c, Fig. 6, and an oil cooler unit (not shown) will be placed in shunting relation about the passage portions 130a and 130b by connecting said unit between the openings shown closed by the plugs 139 and 139a, Fig. 6.

Figure 9:
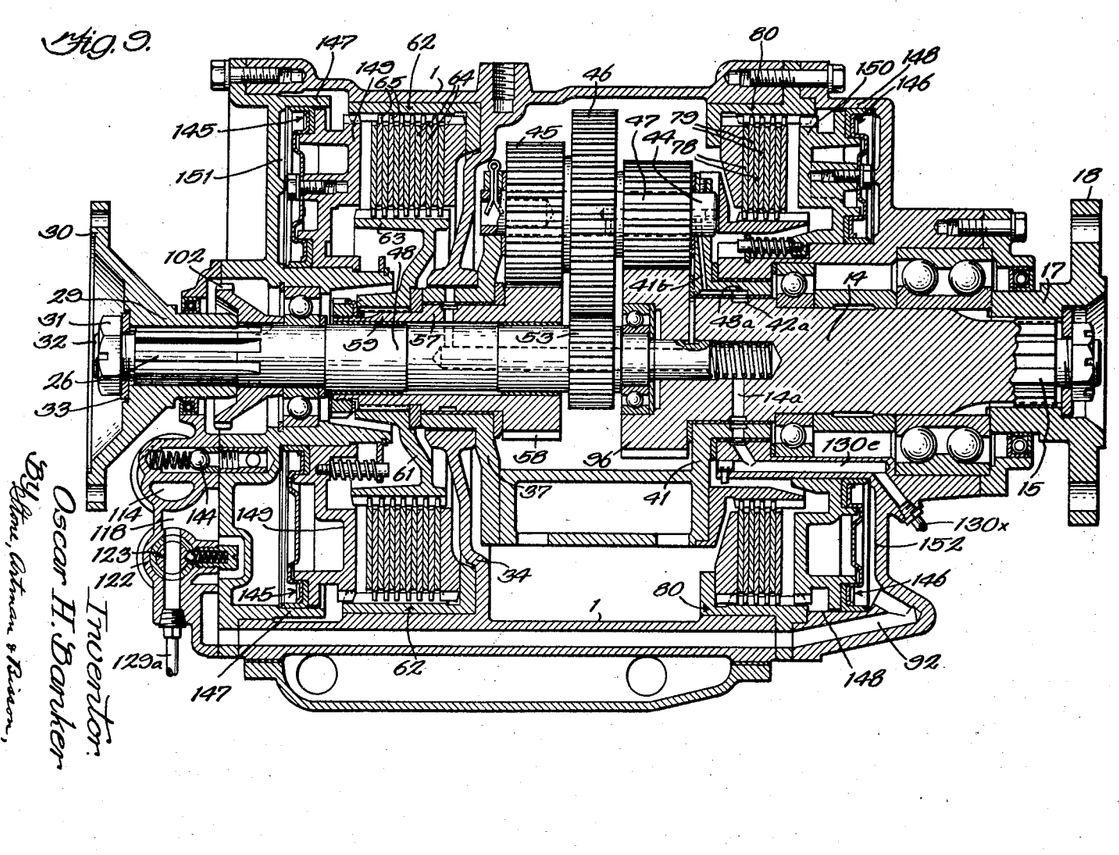
Fig. 9 is a longitudinal sectional view taken through an alternative embodiment of the invention.

Referring to Fig. 9, the structure is generally the same with the same reference characters for the same parts as that shown in Figs. 1 to 8 inclusive, and differs in the form of brake operating means, the brake rings being of somewhat different size. The means for operating these brakes are in the form of annular pistons 145 and 146 movable in annular cylinders 147 and 148 respectively. The pistons have pressure plates or sliders 149 and 150 which compress the friction rings of the brakes. Opposite the pistons are annular oil chambers 151 and 152 connected to the pressure oil supply ducts as ducts 93 and 92 shown in the other figures of the drawings. Lubrication oil is supplied from the pressure regulating chamber 114 through a conduit 130x instead of through the casing passages 130a, 130b, 130c and 130d of Figs. 6 and 1.

In the operation the device at the start is in neutral. The valve 123 is shown in neutral position in Fig. 2. Both brakes 62 and 80 at that time are disengaged while the brake B is engaged. Therefore the driven shaft 14 and the gear 96 will be held against rotation while the sun gear 53 rotating with the drive shaft causes the gear clusters to planetate idly about the gear 96 in the reverse direction (counter-clockwise as viewed from the front or left in Figs. 1 and 9). The gear clusters will be rotating counter-clockwise about their own axes and because of the gears 45 of these clusters having a greater diameter than the gears 47 the sun gear 58 will be idly rotated clockwise. The brake B is applied because oil pumped into the chamber 114 and passing downwardly through the valve member opening 128 into the channel 129 cannot escape through the relief channel 137 and the sump channel 133 since the enlargement 127 on the valve control member 123 blocks communication between the channels 137 and 133. Consequently the oil is forced out of the channel 129 through the conduit 129a to the brake unit B to energize the same. Oil backed up in the chamber 114 forces the piston 115 to the left, uncovering the lubrication channel 130 and thereby limits the oil pressure to an amount not unduly exceeding that necessary to apply the brake while supplying lubricant to the various bearings lead to by the various portions of the channel 130.

Brake 62 is not engaged at this time because the center enlargement 125 on the valve control member prevents communication through the valve sleeve 122 between the ports 121 and 132, preventing the forcing of oil under pressure upwardly through the channel 93 leading to the brake cylinders (cylinders in the Fig. 9 embodiment). On the other hand the annular space between the control member enlargements 125 and 127 provides communication between the channel 93 and the sump channel 133 to permit drainage of the brake cylinders and complete release of the brake.

Brake 80 is not engaged at this time because the center enlargement 125 on the valve control member prevents communication through the valve sleeve 122 between the ports 120 and 131a, preventing the forcing of oil from the pressure chamber 114 outwardly through the channels 131 and 92 to the brake cylinders (cylinder in the Fig. 9 embodiment). Meanwhile oil is drained from these cylinders through the channels 92 and 131, port 131a, sleeve 122 and the drain-to-sump channels 134 and 135.

To establish forward drive the valve control member 124 is moved to the left as viewed in Fig. 2 to place this member in the position illustrated in Fig. 5 wherein the detent recess F is in registry with the detent ball 140, Fig. 7. This movement of the valve control member 124 causes disengagement of the neutral brake B and engagement of the brake 80, Fig. 1, while leaving the brake 62, Fig. 1, disengages. In Fig. 5 it will be seen that the enlargement 125 on the control member 124 blocks the passage 129 so that oil from the pressure chamber 114 can no longer be introduced into the passages leading to the brake motor M. Also it will be noted that the space between the enlargement 125 and the left end enlargement 127 of the valve control member 124 will bridge the space between the drain port 133 and the port at the left end of the passage 137 so that the pressure in the brake cylinder M will be relieved through the conduit 129a, Figs. 1 and 5, said channel 137 and the port 133 to the oil sump. Oil from the pressure chamber 114 will flow downwardly through the channel 117 into the compartment 118 and thence through the port 120, channel 131 and channel 92, Figs. 5, 1 and 3, to the cylinders 89 for moving the pistons 90 and the brake actuating levers 83 associated therewith for closing the brake 80. With the brake 80 thus closed the planet gear carrier will be held against rotation so that the gear clusters thereon function similarly to countershafts whereon the gears 46 and 47 transmit forward drive from the gear 53 to the gear 96 at a reduced speed ratio.

Reverse drive is obtained by shifting the valve control member 124 to its rightmost position which is illustrated by dot-dash lines in Fig. 5. While in this position the detent recess R will be in registry with the detent ball 140. While the valve member is in this position the center enlargement 125 will continue to block off pressure fluid from the neutral brake B as explained above in connection with the forward drive connection. This center section 125 will also have a portion in registry with the port 120 to block off oil from the pump to the passage 92 and hence to the cylinders 89 of the forward brake 80. On the other hand that portion of the valve control member between the enlargements 125 and 126 will bridge the sleeve ports in communication with the channel 131 and the drain ports 134 and 135 so that the pressure in the forward brake cylinders 89 will be relieved through the channel 92, channel 131 and the ports 134 and 135, Figs. 5 and 8. That annular section of the valve control member between the enlargements 125 and 127 will be in communication between the ports 121 and 132 so that fluid under pressure is introduced into the channel 93 which leads to the cylinders 76 for forcing the pistons 74 therein to the right as viewed in Fig. 1 for actuating the levers 72 and applying the brake 62. While the brake 62 is thus applied, holding the sun gear 58 against rotation and while the planet carrier is free to rotate, rotation of the sun gear 53 in a forward direction will cause counter-clockwise rotation of the gear clusters about their own axes as viewed from the left in Fig. 1 whereby the gears 45 will planetate counter-clockwise about the periphery of the held gear 58. Meanwhile the planet gears 47, also rotating about their individual axes in the counter-clockwise direction, will cause the driven sun gear 96 to rotate clockwise with respect to the carrier, but because of the difference in the diameters of the gears 45 and 47 the carrier will be rotating counter-clockwise at a greater actual speed than the clockwise direction of the driven gear 96 relatively to the carrier wherefore the net or actual direction of rotation of the gear 96 will be counter-clockwise or reverse. The driven shaft 14 rotates in the reverse direction with the driven sun gear 96.

Figure 10:
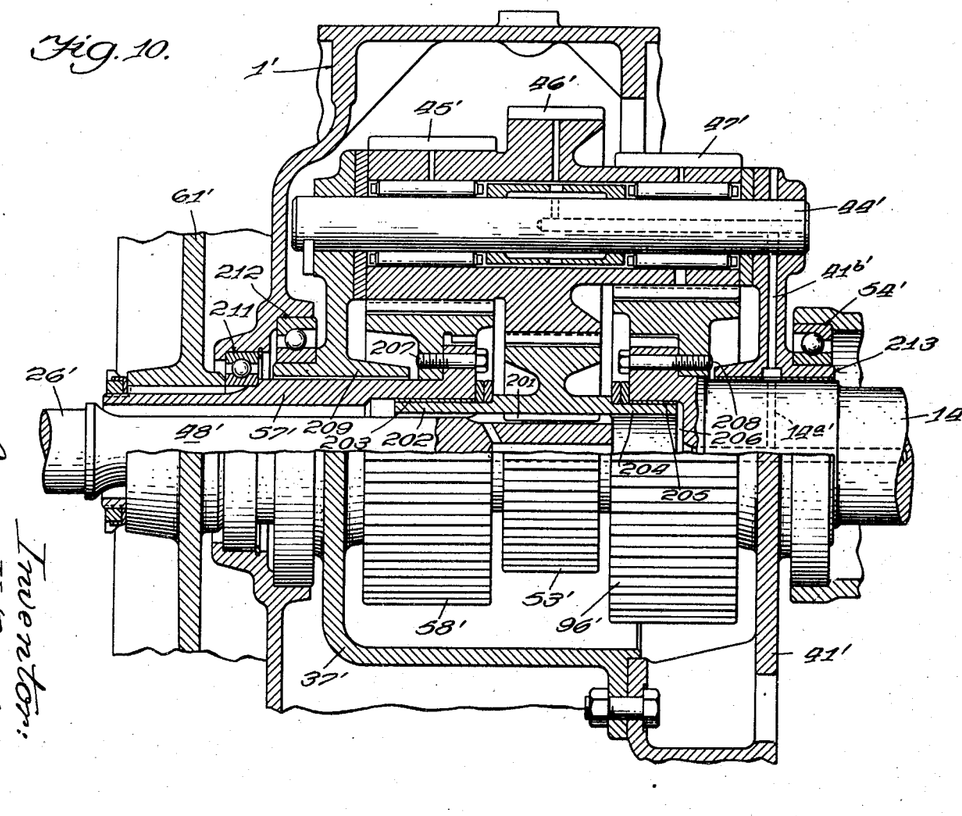
Fig. 10 is a sectional view taken similarly to Figs. 1 and 9 through a modified planetary gear unit.

Fig. 10 shows a modified arrangement for the gearing employable in the layouts of Fig. 1 or 9. In Fig. 10, to expedite the description, the parts corresponding to those in Figs. 1 and 9 are designated by the same respective reference characters with the addition of a prime.

Fig. 10 illustrates an arrangement of gearing in which the sun gear 53′ driven from the drive shaft 26′ is suspended in a floating fashion. While the gear 53′ is driven by the shaft 26′ it is splined thereto at 201 instead of being formed integrally with said shaft. A front hub extension 202 of the gear 53′ is journalled by means of a sleeve 203 in a back end portion of the sleeve on hollow shaft 57′, whereas a back extension 204 of the hub of gear 53′ is journalled by means of a sleeve 205 within the cylindrical side wall of a cavity 206 in the front end of the driven shaft 14′. Sun gear 53′ meshes with the planet gears 46′ as before. Sun gears 58′ and 96′ are formed separately from the sleeve shaft 57′ and the driven shaft 14′ and are secured thereto by bolts 207 and 208.

Sleeve shaft 57′ is spaced radially both from the hub 209 of the planet gear carrier end plate 37′ and from the reduced diameter portion 48′ of the drive shaft 26′ but is rotatively supported in the casing barrel 1′ by a ball bearing unit 211. A second ball bearing unit 212 rotatively supports the carrier end plate 37′ in the casing whereas at the opposite end of the carrier its end plate 41′ is supported in the ball bearing unit 54′ which indirectly through the hub portion 213 of the carrier end plate 41′ lends stabilizing support to the driven shaft 14′.

By making the gears 58′, 53′ and 96′ separate from the shafts with which their hubs are in driving relation, these gears can be made of the preferred hardenable material which is most suitable for their gear teeth while the shafts 57′, 26′ and 14′ drivingly associated with their hubs can be made of a different material which is better suited to resist deterioration when subjected to tortional stress and strain. Keying of the gear 53′ to the back end of the drive shaft 26′ permits of slight lateral movement between a portion of the shaft to which said gear is keyed and the hub of said gear, widening the tolerances of permissible dimensions in the parts. Supporting the sun gear 53′ upon its opposite and widely separated end portions 202 and 204 provides suitable stabilization for said gear and causes this gear to be truly axially aligned with the sun gears 58′ and 96′. Because of the indirect association of the drive shaft 26′ and the driven shaft 14′ through the splined connection 201 with the sun gear 53′, greater tolerance is permissible in the degree of true alignment of the bearing supports for said shafts 26′ and 14′. Likewise because of the indirect association of the shaft 14′ with the hollow shaft 57′ through the bearing sleeves 203 and 205 and the hub of the gear 53′, greater tolerance is permissible in the degree of axial alignment of the bearing unit 211 for said shaft 57′ and the driven shaft 14′.

Having herein described and upon the drawings shown a few illustrative embodiments of the invention the latter is not limited thereto but comprehends other constructions, arrangements of parts, details, features or the like not departing from the spirit of the invention.

I claim:

1. In a power transmission device for marine craft having a driving and a driven shaft, and operatively associated transmission gears and brake means; a gear cluster comprising primary, secondary and tertiary planetary gears rotatably mounted on a carrier which is rotatably carried by the transmission device to planetate relative to said driving and driven shafts, and of which the primary and tertiary gears are respectively operatively connected to the driving and driven shafts, and the secondary gear is operatively connected to a brake means, and said carrier also being operatively connected to a brake means, said brake means comprising mutually movable and engageable friction elements, hydraulic means for mutually moving said elements including a pump operatively connected to said driving shaft and having a fluid connection to said brake means, and a valve in said connection, said hydraulic means also including an annular cylinder, and an annular piston reciprocable in said cylinder and engageable with said elements to produce the mutual movement of said elements.

2. In a power transmission device for marine craft having a driving and a driven shaft, and operatively associated transmission gears and brake means; a gear cluster comprising primary, secondary and tertiary planetary gears rotatably mounted on a carrier which is rotatably carried by the transmission device to planetate relative to said driving and driven shafts, and of which the primary and tertiary gears are respectively operatively connected to the driving and driven shafts, and the secondary gear is operatively connected to a brake means, and said carrier also being operatively connected to a brake means, said brake means comprising hydraulically operable means for operating said brake means and which includes a hydraulic pump operatively connected to said driving shaft and having a manually operable valve movable for controlling the supply of pressure fluid selectively to said brake means, said valve having medial and extreme ports and movable medial and extreme valve members for selectively controlling passage of fluid through said valve for neutral, forward and reverse drive operations of the device, said movable medial member of the valve having a transverse passage for passage of pressure fluid for neutral control of the transmission device.

3. In a marine reversing gear; coaxial drive and driven shafts; a planetary gear unit including a planetary gear carrier journalled coaxially with said shafts and planetary gear clusters each having a primary, a secondary and a tertiary gear, a drive sun gear connecting the drive shaft with the primary cluster gears, a driven sun gear connecting the driven shaft with the secondary cluster gears, and a reversing sun gear meshed with the tertiary planet gears; hydraulically operated brakes each comprising a group of axially movable annular disks coaxial with and respectively rotatively fixed to the reversing sun gear and to the carrier and each brake also comprising a group of cooperating annular disks fixed against rotation and respectively axially slidable into compressed braking relation with the first groups of disks; brake actuating motors respectively energizable when subjected to oil pressure to compress the brake disks; a gear casing enclosing said planetary gear unit and brakes; an oil sump in said casing; an oil pump driven from said drive shaft to pump oil from said sump; an oil pressure regulating chamber incorporated into the structure of said casing communicatively with the pump and having a displaceable wall and a by-pass channel uncoverable by said wall when sufficiently displaced to allow escape of the oil under pressure; and a control valve comprising a casing incorporated into said gear casing and connected between said pressure regulating chamber, brake motors and sump, and said valve including a valve control member manipulative between a neutral and oppositely disposed positions to respectively connect both of the motors for drain into the sump and to selectively connect the motors with the pressure regulating chamber while connecting the other for drain into the sump.

4. In a power transmission device for marine craft having driving and driven shaft means, and operatively associated transmission gears and brake means; the shaft means comprising alined driving and driven shafts and a bearing between them, and a coaxial secondary shaft, primary, secondary and tertiary sun gears respectively on said driving, secondary and driven shafts, a gear carrier rotatably mounted about the axis of said shafts, a planetary gear cluster rotatably carried by the carrier and comprising primary, secondary and tertiary planetary gears respectively operatively connected to said primary, secondary and tertiary sun gears, hydraulically operated brakes operatively associated with said secondary shaft and to said carrier, a pump having communicating connections with said brakes, a control valve in said connections and having means for selectively controlling the operation of said brakes, a third brake operatively associated with said driven shaft and having a hydraulic connection with said valve for operation of said third brake when said valve is in neutral position.

5. In a power transmission device for marine craft having driving and driven shaft means, and operatively associated transmission gears and brake means; a housing barrel, end plates secured to the opposite ends of said barrel, said plates having hubs extending therefrom and having hub plates at the outer ends of the hubs, bearings in said hubs, the shaft means having alined driving and driven shafts with the outer end portions of said shafts rotatably mounted in said bearings, a central bearing at the inner ends of said shafts for rotatably mounting said inner ends of said shafts, a coaxial secondary shaft, primary, secondary and tertiary sun gears respectively on said driving, secondary and driven shafts, a gear carrier rotatably mounted about the axis of said shafts, a planetary gear cluster rotatably carried by the carrier and comprising primary, secondary and tertiary planetary gears respectively operatively connected to said primary, secondary and tertiary sun gears, hydraulically operated brakes operatively associated with said secondary shaft and to said carrier, said brakes being mounted in said barrel, piston and cylinder means in said hubs and having operative connection with said brakes, a pump having communicating connections with said piston and cylinder means, a control valve in said connections and having means for selectively controlling the operation of said piston and cylinder means.

6. In a power transmission device for marine craft having driving and driven shaft means, and operatively associated transmission gears and brake means; a housing barrel, end plates secured to the opposite ends of said barrel, said plates having hubs extending therefrom and having hub plates at the outer ends of the hubs, bearings in said hubs, the shaft means having alined driving and driven shafts with the outer end portions of said shafts rotatably mounted in said bearings, a central bearing at the inner ends of said shafts for rotatably mounting said inner ends of said shafts, a coaxial secondary shaft, primary, secondary and tertiary sun gears respectively on said driving, secondary and driven shafts, a gear carrier rotatably mounted about the axis of said shafts, a planetary gear cluster rotatably carried by the carrier and comprising primary, secondary and tertiary planetary gears respectively operatively connected to said primary, secondary and tertiary sun gears, hydraulically operated brakes operatively associated with said secondary shaft and to said carrier, said brakes being mounted in said barrel, piston and cylinder means in said hubs and having operative connection with said brakes, a pump having communicating connections with said piston and cylinder means, a control valve in said connections and having means for selectively controlling the operation of said piston and cylinder means, a third brake operatively associated with said driven shaft and having a hydraulic connection with said valve for operation of said third brake when said valve is in neutral position.

7. In a reversing gear apparatus, a casing, coaxial drive and driven shafts journalled in said casing and having inner ends in opposed relation, a brakable reaction shaft spacedly about said drive shaft and journalled in said casing independently of the drive shaft, a planetary gear carrier journalled in the casing coaxially of said shafts, sets of planet gears journalled in said carrier, said sets of gears being spaced circumferentially of said carrier and each set including a center gear and end gears at opposite ends of their respective center gear, a sun gear rotatively fixed to the driven shaft and mutually meshed with the planet gears at one end of the center planet gears, a second sun gear rotatively fixed to said brakable shaft and mutually meshed with the planet gears at the other end of the center planet gears, a third sun gear mutually meshed with the center gears of said gear sets and having end extensions journalled respectively in the other two sun gears, said third sun gear having its hub upon said drive shaft, and quill means establishing a driving connection between said third gear hub and the drive shaft.

OSCAR H. BANKER.

REFERENCES CITED

The following references are of record in the file of this patent:

UNITED STATES PATENTS

| Number | Name | Date |
| --- | --- | --- |
| 2,088,782 | Ford | Aug. 3, 1937 |
| 2,251,625 | Hale | Aug. 5, 1941 |
| 1,636,800 | Blood | July 26, 1927 |
| 1,348,251 | Tamura | Aug. 3, 1920 |
| 2,005,726 | Banker | June 25, 1935 |
| 2,330,198 | Banker | Sept. 28, 1943 |
| 2,158,054 | Bradbury | May 16, 1939 |
| 1,217,427 | Fast | Feb. 27, 1917 |
| 2,020,404 | Farkas | Nov. 12, 1935 |
| 2,055,325 | Woolson | Sept. 22, 1936 |
| 2,098,125 | Yoxall | Nov. 2, 1937 |